United States Patent
Moehlenkamp et al.

(10) Patent No.: US 7,675,271 B2
(45) Date of Patent: Mar. 9, 2010

(54) SYSTEM FOR GENERATING ELECTRICAL POWER

(75) Inventors: Georg Moehlenkamp, Großbeeren (DE); Wolfgang Bach, Berlin (DE); Peter Hussels, Berlin (DE)

(73) Assignee: Converteam Technology, Ltd., Warwickshire (GB)

(*) Notice: Subject to any disclaimer, the term of this patent is extended or adjusted under 35 U.S.C. 154(b) by 69 days.

(21) Appl. No.: 12/155,891

(22) Filed: Jun. 11, 2008

(65) Prior Publication Data
US 2009/0278510 A1      Nov. 12, 2009

(30) Foreign Application Priority Data
May 10, 2008    (DE)    .................. 10 2008 023 11

(51) Int. Cl.
*H02P 11/00* (2006.01)
(52) U.S. Cl. .................. 322/22; 322/90; 307/134; 307/135
(58) Field of Classification Search ........... 322/22, 322/23, 90, 99; 290/44, 54, 55; 307/134, 307/135; 361/13
See application file for complete search history.

(56) References Cited

U.S. PATENT DOCUMENTS 5,315,229 A * 5/1994 Markus ............... 322/28
5,694,026 A 12/1997 Blanchet
6,198,250 B1 * 3/2001 Gartstein et al. ........... 320/112

FOREIGN PATENT DOCUMENTS

DE         297 01 914         5/1997
WO    WO 2006/103155        10/2006

OTHER PUBLICATIONS

German Office Action dated Dec. 11, 2008.
English-language translation of German Office Action dated Dec. 11, 2008.

* cited by examiner

*Primary Examiner*—J Gonzalez
*Assistant Examiner*—Iraj A Mohandesi
(74) *Attorney, Agent, or Firm*—Harness, Dickey & Pierce, P.L.C.

(57) ABSTRACT

Described is a system for generating electrical power, which system includes a turbine that is mechanically connected to a generator, which in turn is connected via a multiphase transformer to a load. In at least one embodiment, at least two counter-connected switching devices of the converter are assigned to each phase of the transformer. The transformer is provided on the side facing the converter with two winding arrangements in a star connection. Each of the windings of the first winding arrangement is connected to the switching devices belonging to one phase and switched in one direction. Each of the windings of the second winding arrangement is connected to the switching devices belonging to one phase and switched in the opposite direction. The star points of the two winding arrangements are connected via a direct current choke.

16 Claims, 3 Drawing Sheets

US 7,675,271 B2

SYSTEM FOR GENERATING ELECTRICAL POWER

PRIORITY STATEMENT

This application claims benefit under 35 U.S.C. §119 to German Patent Application No. 10 2008 023 211.4, filed on May 10, 2008 in the German Patent Office, the disclosure of which is incorporated herein in its entirety by reference.

FIELD

At least one embodiment of the invention generally relates to a system for generating electrical power.

BACKGROUND

A system is known from the U.S. Pat. No. 5,694,026, for example, which discloses a turbine that is mechanically directly connected to a generator which, in turn, is connected via a converter and a transformer to a power supply grid. No mechanical gear is disposed between the generator and the turbine. The turbine is supplied with fuel during the operation in the generator mode, so that the generator is driven by the turbine and generates electrical power, which is then fed via the converter and the transformer into the power supply grid.

The generator functions as a motor for the start-up of the turbine from a standstill, wherein the electrical power in that case is supplied by the power supply grid, via the transformer and the converter, to the generator for starting the generator rotation and accelerating the turbine to the desired speed.

SUMMARY

In at least one embodiment of the present invention, the known system for generating electrical power is improved.

The system according to at least one embodiment of the invention includes a turbine that is mechanically connected to a generator which, in turn, is connected to a load via a converter and a multiphase transformer. At least two counter-connected switching devices of the converter are assigned to each phase of the transformer. On the side facing the converter, the transformer is provided with two winding arrangements in a Y or star connection. Each of the windings of the first winding arrangement is connected to the switching devices belonging to one phase and switched in one direction. Each of the windings of the second winding arrangement is connected to the switching devices belonging to one phase and switched in the opposite direction. The star points of the two winding arrangements are connected via a direct current [d.c.] choke.

The direct current choke is thus admitted with a voltage corresponding to the difference between the output voltages of the converter and the voltage at the load, in particular the grid voltage. This voltage is smoothed by the d.c. choke while the current flowing over the d.c. choke is furthermore limited.

It is particularly advantageous, in at least one embodiment, if the generator includes a number of windings and if the converter includes a number of counter-connected switching devices for each phase of the transformer, which corresponds to the number of the generator windings, thus making it possible to use a generator with a plurality of windings.

BRIEF DESCRIPTION OF THE DRAWINGS

Additional features, application options and advantages of the invention are disclosed in the following description of example embodiments of the invention, which are shown in the Figures for the drawings. All described or represented features by themselves or in any optional combination form the subject matter of the invention, independent of their summary in the patent claims or the references back, as well as independent of their formulation and/or representation in the description and/or the drawing.

DETAILED DESCRIPTION OF THE EXAMPLE EMBODIMENTS

Figure 1:
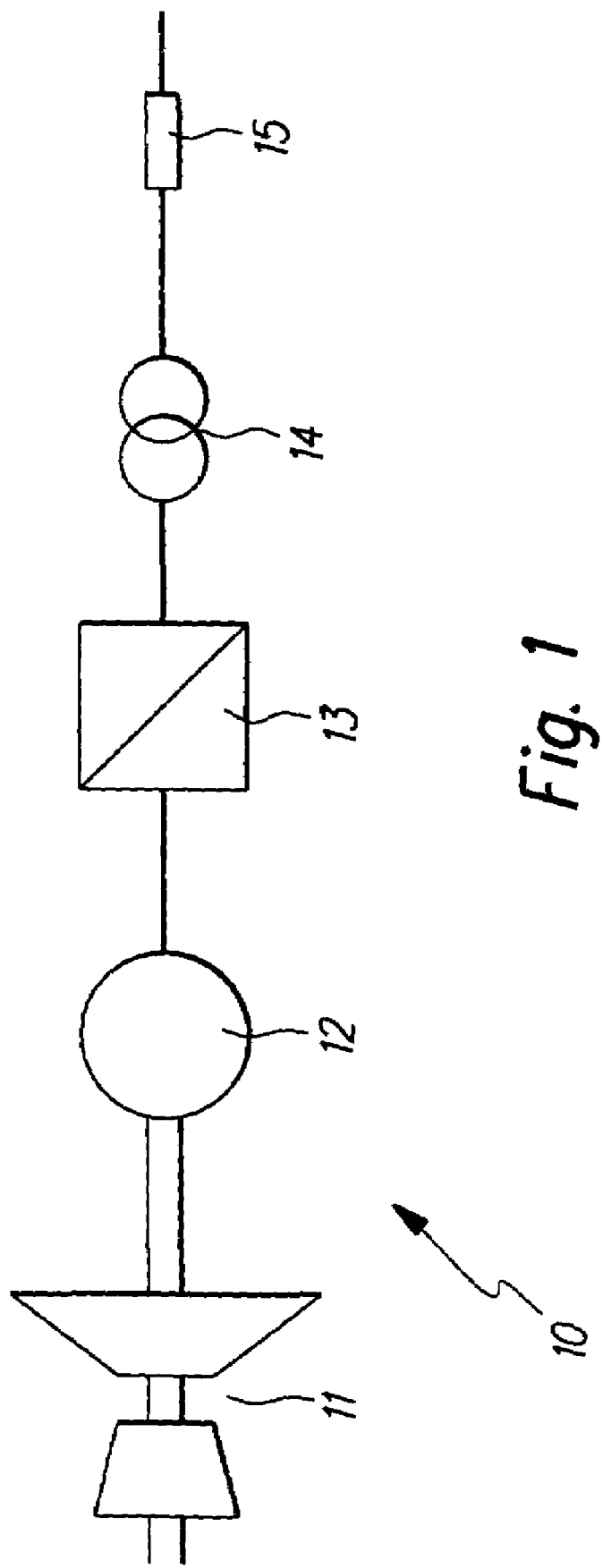
FIG. 1 shows a schematic block diagram of an example embodiment of a system according to the invention for generating electrical power.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes,"

and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

The system 10 according to FIG. 1 for generating electrical power includes a turbine 11, which is mechanically connected directly to an electrical generator 12, without an intermediate gear or the like connected in-between. The generator 12 is connected to a converter 13, to which a multi-phase electrical transformer 14 is connected. The transformer 14 is furthermore connected to an electrical load 15, for example a power supply grid.

During the operation, the turbine 11 rotation is started with the aid of fuels, for example, and owing to the direct mechanical connection the rotation of the generator 12 is also started, thus generating an output voltage with a speed-dependent frequency in the generator operation. With the aid of the converter 13, this changeable frequency of the output voltage is converted to an essentially fixed frequency that corresponds, for example, to the frequency of the power supply grid. Following this, the output voltage is raised with the aid of the transformer 14 to a predetermined voltage, for example the voltage of the power supply grid. The above-described system 10 generates power in this way, which can then be fed into the power supply grid.

Figure 2:
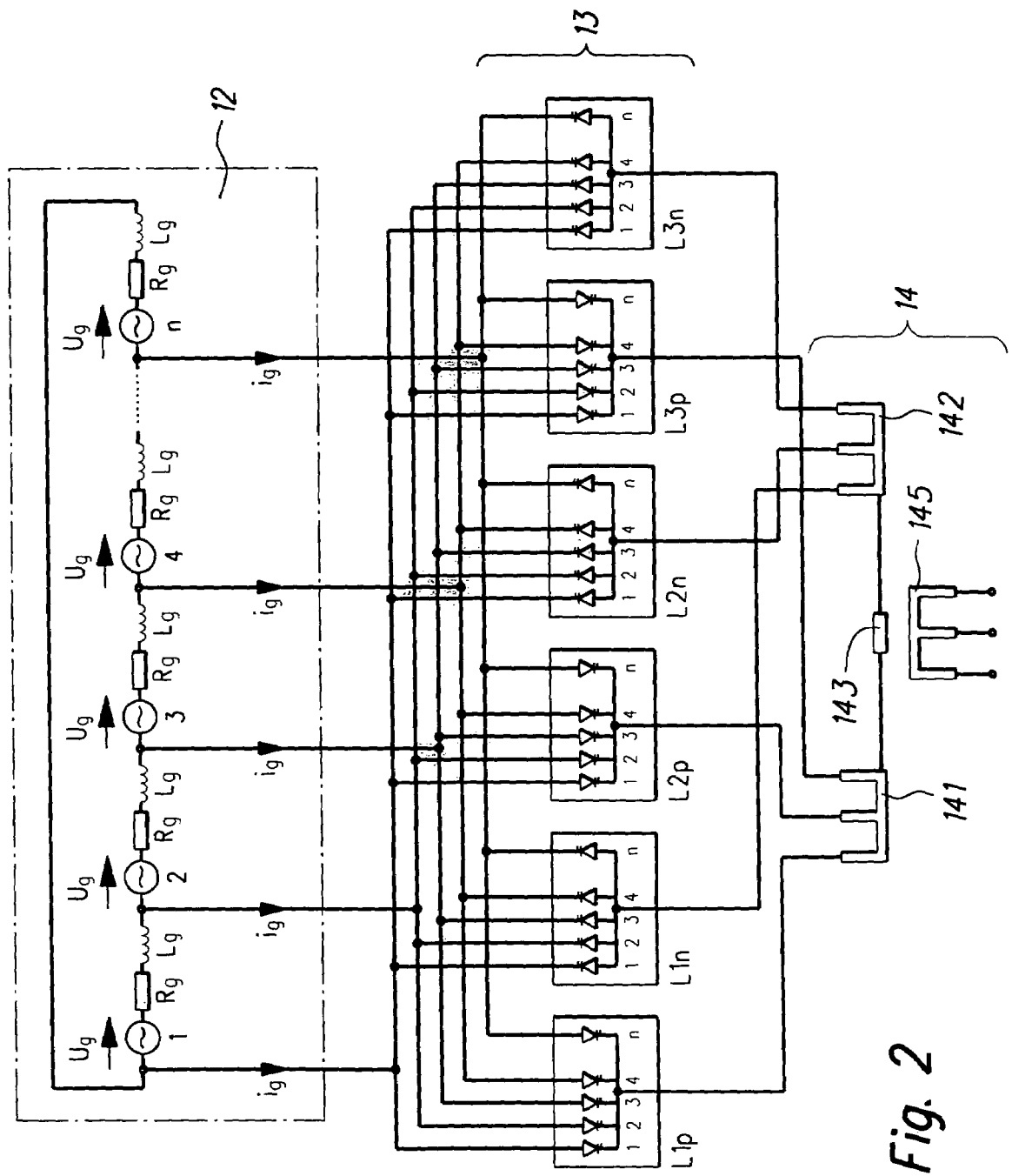
FIG. 2 shows an electrical wiring diagram as example embodiment for an interconnection between a generator, a converter, and a transformer for use in the system according to FIG. 1.

FIG. 2 provides further details of the generator 12, the converter 13 and the transformer 14, as well as the electrical interconnections.

The generator 12 is a synchronous generator with a total number of n windings, wherein these windings in particular have a polygonal shape. As shown in FIG. 2, each of the n windings has a line resistance Rg and a winding inductance Lg. These line resistances Rg and the winding inductances Lg are numbered continuously from "1" to "n." During the generator 12 operation in the generator mode, a voltage Ug is induced in each of these n windings, which results in a current ig being conducted to the converter 13.

The converter 13 is a matrix converter, in particular a three-phase direct converter. Each of the n windings of the generator 12 is connected to three thyristors, switched in a positive current direction, as well as to three thyristors that are switched in a negative current direction. FIG. 2 shows the thyristors that belong together and jointly carry the current of one phase for the power supply grid, respectively as block L1p, L1n, L2p, L2n, L3p, L3n, wherein the numbers refer to the respective phase and the letters have the following meaning: "p=positive current direction" and "n=negative current direction." The thyristors of the blocks L1p, L2p, L3p and those of the blocks L1n, L2n, L3n are switched counter-connected. The thyristors are numbered consecutively from "1" to "n" within the blocks shown. On the side facing the transformer 14, the thyristors of each block are respectively connected into one line.

The transformer 14 in particular is a three-phase block transformer. On the secondary side facing the converter 13, the transformer 14 has two winding arrangements 141, 142, each of which consists of three windings that form a star connection. The star points of these two winding arrangements 141, 142 are connected by way of a direct current choke 143. On the primary side, the transformer 14 comprises an additional winding arrangement 145, which consists of three windings forming a star connection. Alternatively, the windings of the winding arrangement 145 can also form a triangular connection, which is not shown herein.

The three lines coming from the blocks L1p, L2p, L3p are connected to the three windings of the first winding arrangement 141 on the secondary side while the three lines coming from the blocks L1n, L2n, L3n are connected to the three windings of the second winding arrangement 142 on the secondary side. The load 15 is connected to the three windings of the primary-side winding arrangement 145, meaning in particular the power supply grid with a grid voltage.

If the generator 12 is in the generator mode, the turbine 11 rotation is started with the aid of fuels, as previously explained. The electrical power generated by the generator 12 is supplied via the converter 13 and the transformer 14 to the load 15, in particular to the power supply grid.

The converter 13 is commutated in the dependence on the generator 12 in the generator mode. The output currents and/or the output voltages generated by the converter 13 are controlled with the aid of current controllers to a desired sinusoidal course. All positive currents from the converter 13 flow into the winding arrangement 141 of the transformer 14 and all negative currents flow into the winding arrangement 142.

The d.c. choke 143 is admitted in this way with a six-pulse direct current. The voltage at the d.c. choke 143, meaning the voltage between the star points of the two winding arrangements 141, 142 follows from the integrated voltage differences between the output voltages from the converter 13 and the voltage at the load, in particular the grid voltage of the power supply grid. The d.c. choke 143 thus smoothes the output currents arriving from the converter 13, and the d.c. choke 143 in particular limits the harmonic waves of the output currents from the converter 13.

If the turbine 11 is a gas turbine, for example, or a technically similar turbine, the turbine 11 must be accelerated from the standstill to an operational speed in order to start the system 10. In the case of a gas turbine, the turbine 11 must initially be accelerated with an external drive to approx. 70% to 90% of its operating speed, meaning without internal drive, before the turbine 11 can be accelerated further to the full operating speed by feeding in fuel, meaning with an internal drive.

For the acceleration period where the turbine 11 is driven by an external drive, the generator 12 of the aforementioned system 10 functions as a motor. The generator 12 in that case is supplied via the transformer 14 and the converter 13 with electrical power for the rotation, wherein the power is supplied by the load 15, in particular the power supply grid. As a result of the mechanical connection, the turbine 11 rotation is started and the turbine accelerated without requiring a separate drive for the turbine 11. This mode of operation is used at low rotational speeds of the turbine 11 and in particular for the start-up from the standstill.

The thyristors of the converter 13 can be grouped together and operated jointly for this start-up operation. Starting with the standstill of the turbine 11, the groups can be commutated in dependence on the voltage of the load 15, meaning in particular the grid voltage and in dependence on the generator 12 voltage for higher speeds of the turbine 11, wherein a current controller can also be provided for controlling in particular the current flowing over the d.c. choke 143.

Once the turbine 11 reaches approximately 70% to 90% of its operating speed, the thyristors are shut down and the motor function of the generator 12 ends. The turbine 11 is then supplied with fuel, so that the turbine can be accelerated by the internal turbine drive to the full 100% operating speed. As soon as the turbine 11 has reached its operating speed, the previously mentioned operation of the generator 12 in the generator mode starts and power is supplied to the load 15, in particular the power supply grid.

Figure 3:
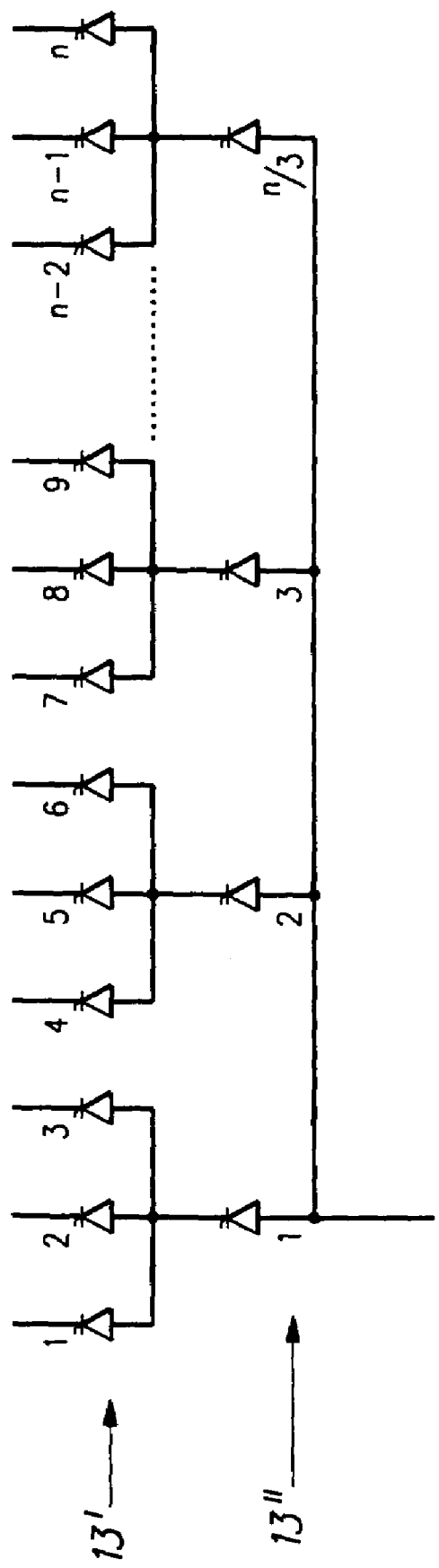
FIG. 3 shows an electrical wiring diagram of an alternative embodiment of the converter according to FIG. 2.

FIG. 3 shows an alternative embodiment of the converter 13, shown in FIG. 2, for which the converter 13 is composed of two stages 13' and 13".

The first stage 13' contains the thyristors numbered consecutively from "1" to "n," which are respectively connected to one of the windings of the generator 12. For the present embodiment, respectively three thyristors are combined into a group in the first stage 13'. In general, p thyristors can always be combined into one group.

Each of these groups is connected to another thyristor in the second stage 13," consecutively numbered from "1" to "n/3" and/or in general from "1" to "n/p". These thyristors are then combined, so that they can be connected to one of the secondary-side winding arrangements 141, 142 of the transformer 14.

With the converter 13 embodiment shown in FIG. 3, the number of series-connected, required thyristors can be reduced, especially for higher voltages.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A system for generating electrical power, comprising: a turbine, mechanically connected to a generator, the generator being electrically connected via a converter and a multiphase transformer to a load, wherein at least two counter-connected switching devices of the converter are assigned to each phase of the transformer, the transformer including two winding arrangements in a star connection on the side facing the converter, each of the windings of the first winding arrangement is connected to the switching devices belonging to one phase and switched in one direction, each of the windings of the second winding arrangement being connected to the switching devices of one phase and switched in the opposite direction, and the star points of the two winding arrangements being connected to each other via a direct current choke.

2. The system according to claim 1, wherein the generator includes a number of windings and wherein the converter includes, for each phase of the transformer, a number of counter-connected switching devices, which correspond to the number of the generator windings.

3. The system according to claim 1, wherein the switching devices of the converter are commutated in dependence on the generator in the generator mode.

4. The system according to claim 1, wherein the generator functions as a motor for the start-up of the turbine.

5. The system according to claim 4, wherein for low rotational speeds of the turbine, the switching devices of the converter are commutated during the motor function of the generator in dependence on the load.

6. The system according to claim 1, wherein the turbine is connected directly to the generator.

7. The system according to claim 1, wherein the generator is embodied as synchronous generator.

8. The system according to claim 1, wherein the converter is embodied as matrix converter.

9. The system according to claim 1, wherein the converter has a two-stage design.

10. The system according to claim 1, wherein the turbine is a gas turbine.

11. The system according to claim 2, wherein the switching devices of the converter are commutated in dependence on the generator in the generator mode.

12. The system according to claim 2, wherein the generator functions as a motor for the start-up of the turbine.

13. The system according to claim 5, wherein for low rotational speeds of the turbine, the switching devices of the converter are commutated during the motor function of the generator in dependence on the power supply grid.

14. The system according to claim 7, wherein the generator is embodied as synchronous generator with a polygonal embodiment of the windings.

15. The system according to claim 8, wherein the converter is embodied as direct converter.

16. The system according to claim 9, wherein the converter has a two-stage design for higher voltages.

* * * * *